US011482870B2

(12) United States Patent
Selby et al.

(10) Patent No.: US 11,482,870 B2
(45) Date of Patent: Oct. 25, 2022

(54) VEHICLE BATTERY CHARGING APPARATUS

(71) Applicant: Amphenol Tecvox, LLC, Madison, AL (US)

(72) Inventors: Steven F. Selby, Athens, AL (US); Tommy L. Roberts, Cullman, AL (US)

(73) Assignee: AMPHENOL TECVOX, LLC, Huntsville, AL (US)

( * ) Notice: Subject to any disclaimer, the term of this patent is extended or adjusted under 35 U.S.C. 154(b) by 72 days.

(21) Appl. No.: 16/795,383

(22) Filed: Feb. 19, 2020

(65) Prior Publication Data

US 2021/0126482 A1    Apr. 29, 2021

Related U.S. Application Data

(60) Provisional application No. 62/925,029, filed on Oct. 23, 2019.

(51) Int. Cl.
*H02J 7/00* (2006.01)
*H02J 50/10* (2016.01)

(52) U.S. Cl.
CPC .......... *H02J 7/00309* (2020.01); *H02J 50/10* (2016.02)

(58) Field of Classification Search
CPC ....................................................... H02J 50/10
USPC ........................................................ 320/108
See application file for complete search history.

(56) References Cited

U.S. PATENT DOCUMENTS

| 10,782,752 | B2 | 9/2020 | Koo et al. |
| 2014/0007594 | A1* | 1/2014 | Lofy ................. H02J 7/025 62/3.2 |
| 2014/0125277 | A1 | 5/2014 | Van Wiemeersch et al. |
| 2016/0087485 | A1 | 3/2016 | Maeda et al. |
| 2016/0344221 | A1 | 11/2016 | Kramer et al. |
| 2017/0047769 | A1* | 2/2017 | Kim ..................... H02J 7/0029 |
| 2018/0224909 | A1* | 8/2018 | Koo ......................... G06F 1/203 |
| 2019/0014683 | A1* | 1/2019 | Han ......................... H02J 50/10 |
| 2021/0050741 | A1* | 2/2021 | Pinkos ................. H01F 27/025 |

FOREIGN PATENT DOCUMENTS

| DE | 102018201300 | * | 1/2018 | ............ B60R 16/03 |
| WO | WO-2018/143515 A1 | | 8/2018 | |

OTHER PUBLICATIONS

Extended European Search Report for EP 20203291, dated Mar. 11, 2021, 8 pgs.

* cited by examiner

*Primary Examiner* — Edward Tso
*Assistant Examiner* — Ahmed H Omar
(74) *Attorney, Agent, or Firm* — Cantor Colburn LLP

(57) ABSTRACT

A vehicle battery charging apparatus for wirelessly charging a device. The apparatus has a charging device compartment with a platform for retaining the device, and a battery charger housing for retaining a wireless battery charger. One or more housing vents are provided in the battery charger housing. And, a blower is in air communication with the battery charger housing to communicate air with the battery charger housing through the one or more housing vents to cool the wireless battery charger.

18 Claims, 3 Drawing Sheets

VEHICLE BATTERY CHARGING APPARATUS

CROSS-REFERENCE TO RELATED APPLICATIONS

This application claims the benefit of U.S. Provisional Application No. 62/925,029, filed Oct. 23, 2019, the entire contents of which are incorporated herein by reference.

FIELD

The present disclosure relates to a battery charging apparatus. More particularly, the present disclosure relates to a wireless battery charging and cooling apparatus for a vehicle.

BACKGROUND

Wireless chargers have been developed for charging batteries, and especially batteries that are used in portable devices such as smart phones. The wireless chargers typically include an enclosed charging device and a platform positioned on the outside of the charging device. The device being charged is placed on the platform, and power is wirelessly transmitted from the charging device to the battery being charged, through the battery enclosure and platform. However, those wireless chargers, as well as the battery being charged, generate a lot of heat during the charging process.

SUMMARY

An aspect of this disclosure is a vehicle battery charging apparatus for wirelessly charging a device having a charging device compartment with a platform for retaining the device, a battery charger housing for retaining a wireless battery charger, one or more housing vents in the battery charger housing; and a blower in air communication with the battery charger housing for communicating air with the battery charger housing through the one or more housing vents to cool the wireless battery charger. The preceding subject matter of this paragraph characterizes example 1 of the present disclosure.

The one or more housing vents include one or more intake housing vents and one or more exhaust housing vents. The preceding subject matter of this paragraph characterizes example 2 of the present disclosure, wherein example 2 also includes the subject matter according to example 1, above.

The blower is inside the battery charger housing. The preceding subject matter of this paragraph characterizes example 3 of the present disclosure, wherein example 3 also includes the subject matter according to example 1 or 2, above.

The vehicle battery charging apparatus includes the wireless battery charger. The preceding subject matter of this paragraph characterizes example 4 of the present disclosure, wherein example 4 also includes the subject matter according to any of examples 1-3, above.

The blower is a fan. The preceding subject matter of this paragraph characterizes example 5 of the present disclosure, wherein example 5 also includes the subject matter according to any of examples 1-4, above.

The platform has a top surface with a rubber coating or anti-skid coating. The preceding subject matter of this paragraph characterizes example 6 of the present disclosure, wherein example 5 also includes the subject matter according to any of examples 1-5, above.

The vehicle battery charging apparatus also includes at least one raised wall extending upward from the platform at one or more sides of the platform. The preceding subject matter of this paragraph characterizes example 7 of the present disclosure, wherein example 7 also includes the subject matter according to any of examples 1-6, above.

The vehicle battery charging apparatus has one or more wall vents in the at least one raised wall, wherein the one or more housing vents are in air flow communication with the one or more wall vents. The preceding subject matter of this paragraph characterizes example 8 of the present disclosure, wherein example 8 also includes the subject matter according to example 7, above.

The vehicle battery charging apparatus has one or more platform vents formed in the platform, the blower in air communication with the one or more platform vents via the one or more housing vents. The preceding subject matter of this paragraph characterizes example 9 of the present disclosure, wherein example 9 also includes the subject matter according to any of examples 1-8, above.

The battery charger housing is configured to be sufficiently close to the platform so that the wireless battery charger wirelessly charges the device in the platform. The preceding subject matter of this paragraph characterizes example 10 of the present disclosure, wherein example 10 also includes the subject matter according to any of examples 1-9, above.

The charging device compartment and the battery charger housing form a single unitary piece. The preceding subject matter of this paragraph characterizes example 11 of the present disclosure, wherein example 11 also includes the subject matter according to any of examples 1-10, above.

The vehicle battery charging apparatus is built-in to a vehicle dashboard and the charging device compartment is accessible to a user and the battery charger housing is recessed within the dashboard and inaccessible to the user. The preceding subject matter of this paragraph characterizes example 12 of the present disclosure, wherein example 12 also includes the subject matter according to any of examples 1-11, above.

Another aspect of this disclosure is a vehicle dashboard having a dashboard housing, a battery charging device compartment built-in to the dashboard, a battery charging device having a platform for retaining a device to be charged, and a battery charger housing built-in to the dashboard, the battery charger housing retaining a wireless battery charger. The preceding subject matter of this paragraph characterizes example 13 of the present disclosure.

The vehicle dashboard also has one or more housing vents in the battery charger housing and a blower in air communication with the battery charger housing for communicating air with the battery charger housing through the one or more housing vents to cool the wireless battery charger. The preceding subject matter of this paragraph characterizes example 14 of the present disclosure, wherein example 14 also includes the subject matter according to example 13, above.

The blower is a fan. The preceding subject matter of this paragraph characterizes example 15 of the present disclosure, wherein example 15 also includes the subject matter according to example 13 or 14, above.

The platform has a top surface with a rubber coating. The preceding subject matter of this paragraph characterizes example 16 of the present disclosure, wherein example 16 also includes the subject matter according to any of examples 13-15, above.

The vehicle dashboard has at least one raised wall extending upward from the platform at one or more sides of the platform. The preceding subject matter of this paragraph characterizes example 17 of the present disclosure, wherein example 17 also includes the subject matter according to any of examples 13-16, above.

The vehicle dashboard has one or more wall vents in the at least one raised wall, wherein the one or more housing vents are in air flow communication with the one or more wall vents. The preceding subject matter of this paragraph characterizes example 18 of the present disclosure, wherein example 18 also includes the subject matter according to any of examples 13-17, above.

The vehicle dashboard has one or more platform vents formed in the platform, the blower in air communication with the one or more platform vents via the one or more housing vents. The preceding subject matter of this paragraph characterizes example 19 of the present disclosure, wherein example 19 also includes the subject matter according to any of examples 13-18, above.

The battery charger housing is configured to be sufficiently close to the platform so that the wireless battery charger wirelessly charges the device in the platform. The preceding subject matter of this paragraph characterizes example 20 of the present disclosure, wherein example 20 also includes the subject matter according to any of examples 13-19, above.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

An example disclosed is a vehicle battery charging apparatus for wirelessly charging a device, the apparatus comprising a charging device compartment having a platform for retaining the device, a battery charger housing for retaining a wireless battery charger, one or more housing vents in the battery charger housing; and a blower in air communication with the battery charger housing for communicating air with the battery charger housing through the one or more housing vents to cool the wireless battery charger.

Another example disclosed is a vehicle dashboard having a dashboard housing, a battery charging device compartment built-in to the dashboard, the battery charging device having a platform for retaining a device to be charged. The dashboard also has a battery charger housing built-in to the dashboard, the battery charger housing retaining a wireless battery charger.

Figure 1:
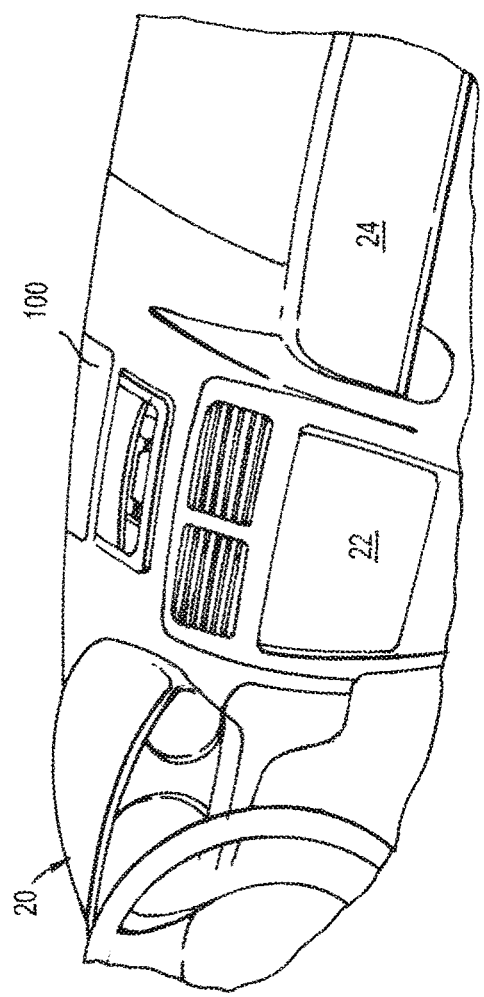
FIG. 1 is a perspective view of an interior vehicle compartment showing a battery charging apparatus built-in to the vehicle dashboard.

Turning to the drawings, FIG. 1 shows the interior of a vehicle having a dashboard 20, control panel 22, and a storage compartment such as a glove box 24. The dashboard 20 has a housing with an outer surface. The storage compartment 24 is positioned in the dashboard housing 20 at the passenger side of the vehicle and substantially flush with the dashboard housing outer surface. The control panel 22 is positioned in the dashboard housing 20 at the center of the vehicle between the driver and the passenger and substantially flush with the outer surface of the dashboard housing. The control panel 22 includes a variety of instrument controls, such as a radio, air conditioner, heater, blower, navigation unit with GPS (Global Positioning System), and rear camera.

In accordance with one example embodiment of the present disclosure, a battery charging apparatus 100 is built-in to the dashboard 20 above or below the control panel 22 and air vents of the vehicle. As shown, the battery charging apparatus 100 is positioned inside the dashboard 20 at the center of the vehicle between the passenger and the driver; though the battery charging apparatus 100 can be at any suitable position such as in the storage compartment 24 or at the rear seats or in the roof. In addition, though the battery charging apparatus 100 is shown built-in to the dashboard housing 20 and flush with the outer surface of the dashboard housing 20, it can be a separate component that is attached to the dashboard 20 or other vehicle component.

Figure 2:
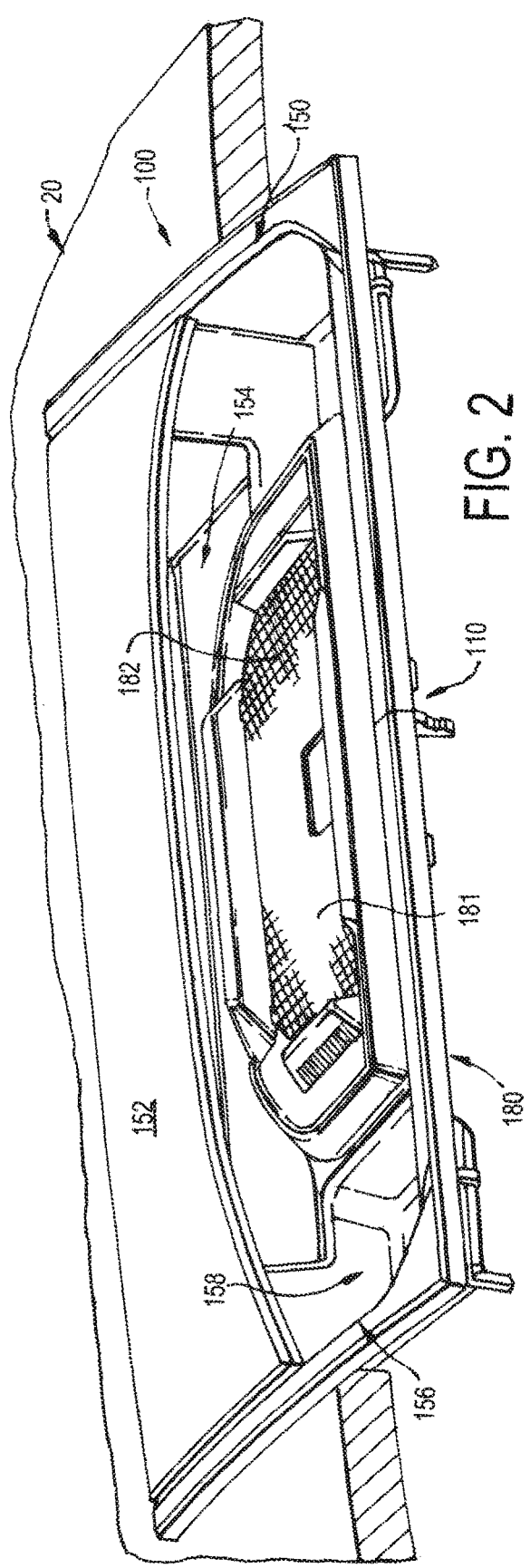
FIG. 2 is a perspective view of the battery charging apparatus of FIG. 1.
Figure 3:
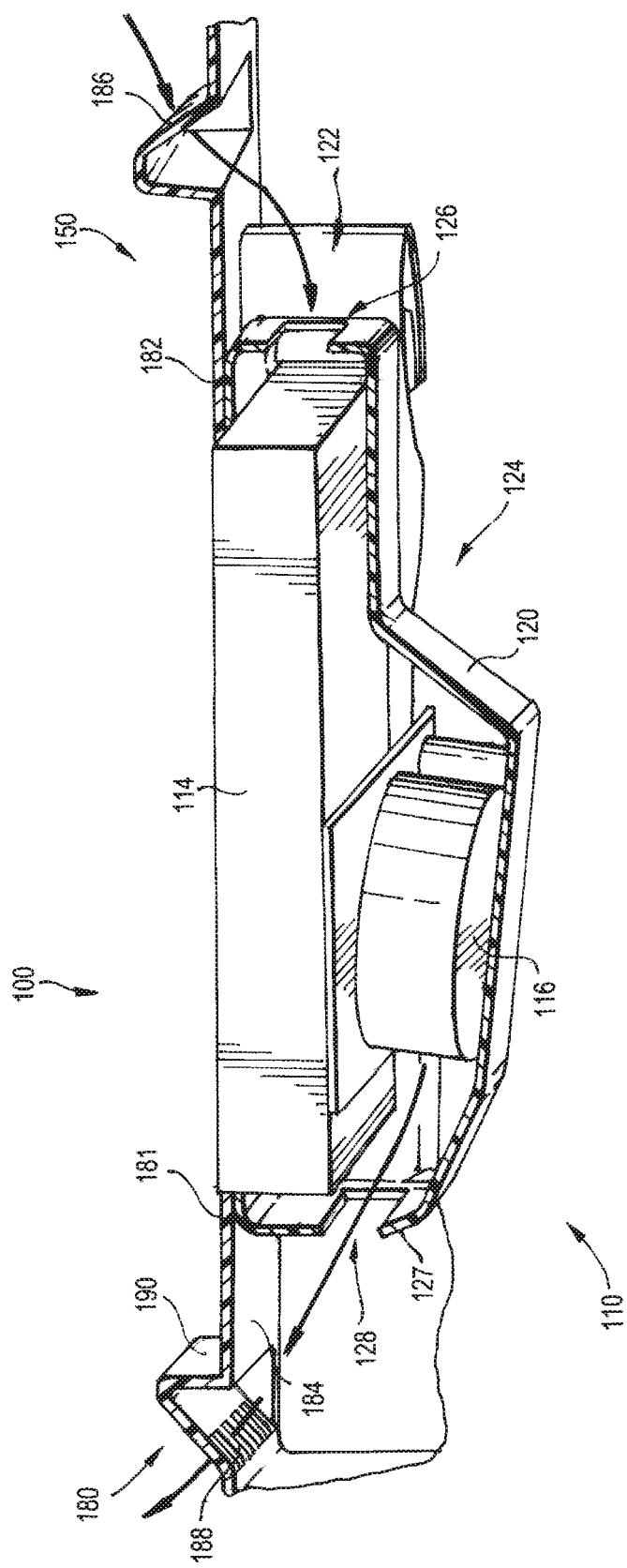
FIG. 3 is side cross-sectional view of the battery charging apparatus of FIG. 1.

FIGS. 2, 3 show the battery charging apparatus 100 in greater detail. The apparatus 100 has a charger compartment 110, a charging device compartment or storage compartment 150, and a tray 180 therebetween. The charging device compartment 150 retains the device being charged, such as a smart phone or other portable device. The charger compartment 110 encloses the power supply that provide power to device being charged. When used with a wireless charging device, the charger compartment 110 is immediately adjacent to the charging device compartment 150, so that the wireless charger is as close as possible to the battery of the device being charged. The charger compartment 110 is located beneath the charging device compartment 150, as illustrated, though other suitable arrangements can be provided such as that the compartments 110, 150 are side-by-side. The tray 180 has a central platform 181 with a top surface 182 and a bottom surface 184 opposite the top surface 182.

Battery Charger Compartment 110

Figure 5:
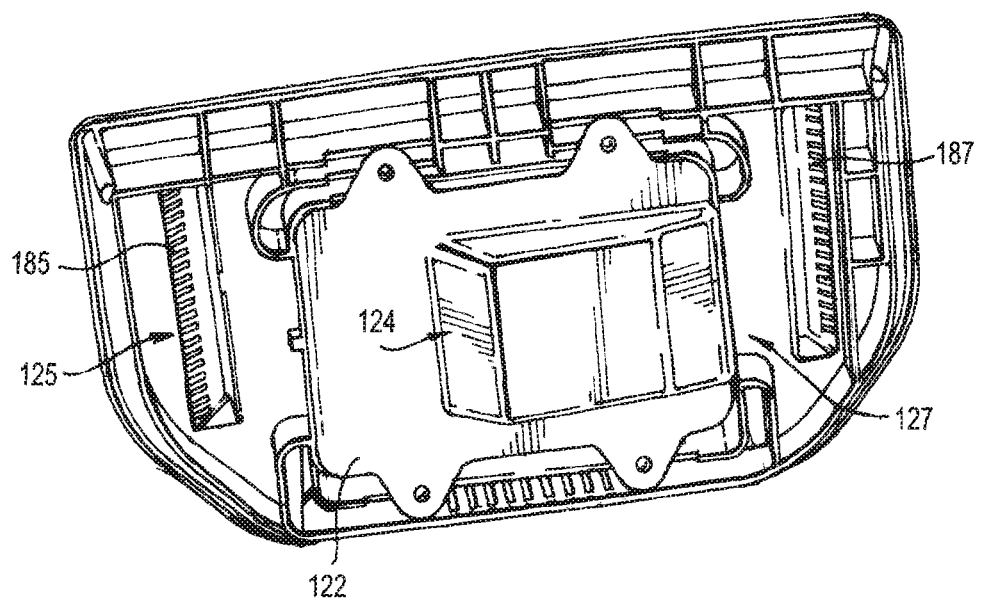
FIG. 5 is a bottom view of the battery charging apparatus.

Referring to FIGS. 3, 5, the charger compartment 110 has a housing 120, a battery charger 114, and a blower or fan 116. The battery charger 114 can be a wireless battery charger and/or a wired battery charger, and can be electrically coupled with the vehicle power supply (e.g., the vehicle battery) to generate power that is used to charge the battery being charged. As shown, the battery charger 114 has a rectangular cuboid shape with a rectangular cross-section. The battery charger 114 has a flat top surface and a flat bottom surface. The blower 116 is also electrically coupled to the vehicle power supply or the battery charger 114 to power the blower 116. A sensor or processing device is provided to turn the blower ON and OFF as needed, depending on the temperature inside the housing 120. For example, the sensor detects the temperature inside the housing 120 or the temperature of the charging device 114, and turn ON the blower 116 when the sensed temperature exceeds a threshold value. Or the processing device can control operation of the blower based on the sensed temperature and other conditions, such as the status of the battery charger 114 and the temperature on the inside of the vehicle. The processing device can be a separate component, or can be part of the vehicle control panel 22 and general HVAC (heating, ventilation, air conditioning) operation.

The housing 120 is a thin sheet that forms an airtight enclosure that houses the battery charger 114 and the blower 116. The housing 120 is made of rigid plastic and molded. The housing 120 has a battery charger housing section 122 that receives the battery charger 114, and a blower housing section 124 that receives the blower 116. The housing 120 is rectangular or square shaped, and has an intake end 125, an exhaust end 127 opposite the intake end 125, two sides, and a bottom. The top of the housing 120 is formed by the bottom surface 184 of the platform 181, or the housing 120 can have a separate top or a combination of the platform 181 and a separate partial top. Thus, the flat top surface of the battery charger 114 contacts the flat bottom surface 184 of the platform 181, or the flat bottom surface of the top of the housing 120, which in turn contacts the flat bottom surface 184 of the platform 181. Thus, the battery charger 114 is positioned as closely as possible to any device to be charged that is placed on the top surface 182 of the platform 181, to maximize the efficiency of the power transfer from the batter charger 114 to the device being charged.

The blower housing section 124 extends outward away from the battery charger 114 and battery charger housing section 122, at the bottom of the housing 120 to accommodate the added size of the blower 116 that is received therein. The battery charger housing section 122 and the blower housing section 124 together form a single integral unit defining an interior space that includes a battery charger interior space that receives the battery charger 114 and a blower interior space that receives the blower. The battery charger interior space is contiguous and in air flow communication with the battery charger interior space.

One or more intake openings or vents 126 are located at the intake end 125 of the housing 120, and one or more exhaust openings or vents 128 are located at the exhaust end 127 of the housing 120. More specifically, the vents 126, 128 are provided in the battery charger housing section 122 of the housing 120. Still further, an intake vent can be provided at the rear of the housing 120 (e.g., in the battery charger section 122). Accordingly, when the blower 116 is turned ON, it pulls air into the housing 120 through the intake vents 126, across the battery charger 114, and out through the exhaust vents 128. As the air is drawn across the battery charger 114, it is heated by the battery charger 114, which cools the battery charger 114, and the heated air is exhausted. In one example of the disclosure, the battery charger 114 is spaced apart from the platform 181 or top of the housing 120, so that air flows across the top of the battery charger 114 in the space between the platform 181 and the battery charger 114 to further cool the battery charger 114. Charging Device Compartment 150

Figure 4:
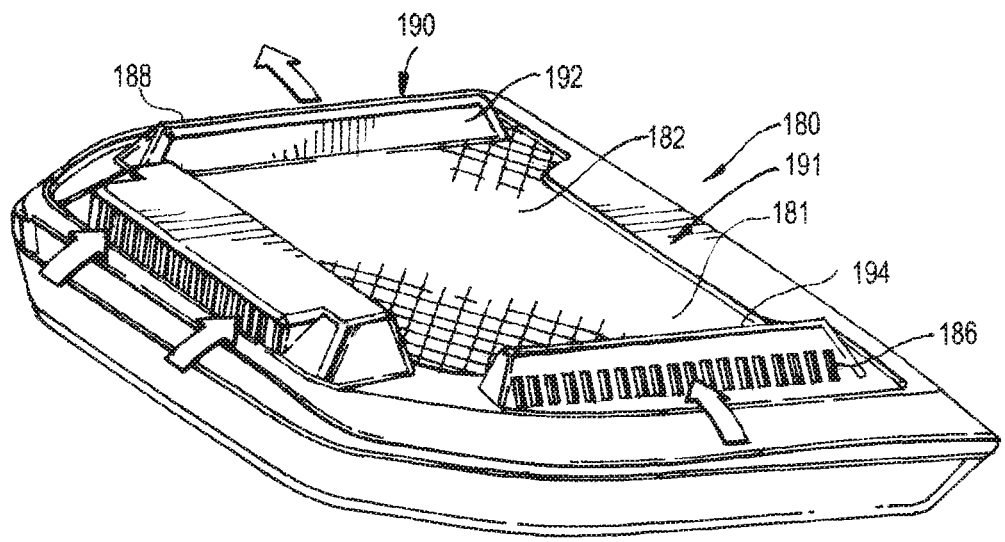
FIG. 4 is a perspective view of the tray with cooling vents.

Referring to FIGS. 2, 4, the charging device compartment 150 is shown in further detail. The compartment 150 includes the tray 180 and a protective cover or shield 152. In the example embodiment shown, the protective cover 152 extends at the top of the charging device compartment 150, and the front facing side is open to form a front opening 156 and define a protected interior space 154. Accordingly, the protective cover 152 extends over the tray 180 and creates the protected space 154 that is accessible through the front opening 156. The tray 180 is at least partly covered by the cover 152 and at least partly within the protected space 154 and accessible through the front opening 156. The cover 152 is opaque to provide protection from the sun and conform with the color scheme for the rest of the dashboard 20. The cover 152 also prevents the devices held in the tray 180 from escaping due to motion of the vehicle, and protect the devices against other objects inadvertently coming into contact with them.

The tray 180 is a flat surface. In addition, as best illustrated in the example embodiment of FIGS. 2, 4, one or more tray vents including one or more tray intake vents 186 and one or more tray exhaust vents 188, is provided in the tray 180. For example, the vents 186, 188 are provided in the platform 181 or at one or more sides of the tray 180 at the periphery of the tray 180 and about the central platform 181, including at the longitudinal sides and/or the lateral transverse sides of the tray 180 or platform 181. However, the vents 186, 188 need not be at the periphery of the tray or platform, but can be inside the periphery of the tray or platform.

Referring to FIG. 3, The vents 186, 188 allow air from the interior of the vehicle to enter the dashboard 20 and communicate with the battery charger housing section 122 in the space beneath or behind the tray 180. Thus, the blower 116 pulls cool air in through the tray intake vent 186 and through the battery charger intake vent 126, and forces heated air out through the battery charger exhaust vent 128 and the tray exhaust vent 188. In one example of the disclosure, baffles or plenums are placed on the outside of the housing 120 to direct air from the tray intake vent 186 to the storage intake vent 126, and from the storage exhaust vent 128 to the tray exhaust vent 188.

In one example, the tray 180 is a flat top surface 182 that forms a platform 181, and the tray vents 186, 188 are formed in the flat top surface 182 of the platform 181. Still further, the tray or platform vents 186, 188 optionally have baffles or fins that direct air out of the charging device compartment 150, so that the intake vent 186 pulls air from the passenger compartment through the front opening 156 and the exhaust vent 188 expels air into the passenger compartment through the front opening 156.

In another example, as shown, the tray 180 has one or more raised walls 190 positioned at the outer periphery of the platform 181 at the one or more sides of the platform 181, including at the front side, back side, left side, and right side. The walls 190 extend upward from the top surface 182 of the central platform 181. The walls 190 define a central receiving area 191 of the platform 181, and the walls 190 are formed about the sides of the platform 181. However, the walls 190 need not be at the periphery of the tray or platform, but instead are inside the periphery of the tray or platform.

In one example embodiment shown, the raised walls 190 have an inwardly-facing side 192 and an outwardly-facing side 194, and a flat or curved top therebetween, forming an elongated pyramid-like shape with a triangular cross-section. The inwardly-facing side 192 are substantially straight, or slightly angled outward, and prevents the device being charged from inadvertently falling out of the platform 181 and tray 180. The outwardly-facing side 194 are angled more sharply inward to provide a more ergonomic shape, or are substantially vertical, both of which are shown in FIG. 4. The tray vents 186, 188 need not be provided in the platform 181, but instead are formed as wall vents 186, 188 in the outwardly-facing sides 192 of the raised walls 190. Thus, the wall vents 186, 188 face outwardly away from the central platform 181 and away from any devices to be charged that are in the platform 181. Accordingly, hot air from the exhaust wall vents 188 is directed away from the tray 180 and the devices being charged. Still further, the wall vents 186, 188 have baffles or fins that direct air out of the charging device compartment 150, so that the intake vent 186 pulls air from the passenger compartment through the front opening 156 and the exhaust vent 188 expels air into the passenger compartment through the front opening 156.

In one example embodiment, the top surface 182 of the platform 181 have a rubber coating that grips the device being charged so that the device does not slide around on the tray 180 as the vehicle is in motion.

Thus, the entire battery charging apparatus 100 is formed integral with the dashboard housing 20 and substantially flush with the outer surface of the dashboard housing 20. The charging device compartment 150 is exposed at the dashboard 20 so that the user can place a device to be charged on the top surface 182 of the platform 181 of the tray 180. The charger compartment 110 is recessed inside the dashboard 20 below the charging device compartment 150. The tray 180 separates the charging device compartment 150 and the charger compartment 110. The blower 116 draws air from the interior of the vehicle into the charging device compartment 150 at the interior of the dashboard 20 to cool the battery charging device 114, and expels heated air from charging device compartment 150 out of the dashboard 20 into the interior of the vehicle. Still further, air need not be pulled in and expelled into the vehicle interior, but can be communicated from other locations, such as the exterior of the vehicle.

In addition, the charging device compartment 150 includes other features. For example, one or more side compartments or holders 158 are provided. In FIG. 1, the holders are shown on each side of the tray 180, and are smaller recessed compartments that hold miscellaneous items such as change, keys, and electronic items.

In addition, it is noted that the cover 152 is fixed and provides an opening 158 at the front of the charging device compartment 158. That opening 158 grants access to the tray 180 so that users can readily insert and remove devices to be charged. In addition, the open front allows heated air from the blower to communicate air with the vehicle interior to receive cooler air from the vehicle interior and pass heated air to the vehicle interior. However in one example of the disclosure, the cover 152 completely closes the charging device compartment 158, or a separate movable cover is provided that is opened and closed by the user to gain access to the charging device compartment 158. In one example, the movable cover has vents that permit air to communicate with the blower, or the vents in the tray 180 are instead provided in the movable cover and plenums are provided to communicate the air to the cover vents. In addition, one or more vehicle HVAC blowers are provided in the charging device storage area 150 to provide cooled air to the charging device compartment 150.

Still further, the blower need not communicate air through the tray 180 or the moveable cover. Instead, the blower an communicate air to the interior of the dashboard, or directly with the vehicle air conditioning and/or heater blower or plenums. Or, the blower communicates air directly with the vehicle interior through vents provided in the front face of the dashboard. For example, the tray 180 extends downward to form the charging device housing 120 and enclose the charger 114 and blower 116, as well as have a front face with an outer surface that forms a surface of the dashboard that faces the user. One or more vents are provided in that front surface and the blower 116 communicates air directly to/from the vehicle interior (i.e., passenger compartment).

It is further noted that, as shown in FIG. 2, the platform intake vent 186 is provided on the driver side and rear of the platform 181, and the platform exhaust vent 188 is provided toward the passenger side of the platform 181. Thus, a vent or wall 190 is not provided at the front of the platform 181 so that it does not obstruct the user from placing devices on the platform 181 for charging. However, in one example, a vent and/or wall 190 is also provided at all four sides of the platform 181, including the front of the platform 181 to prevent devices placed on the platform 181 from falling forward out of the platform 181. And, vents and/or walls are provided at any suitable locations and more or fewer vents and/or walls can be provided. For example, in one embodiment, vents and/or walls are provided at all four sides of the platform 181, or only at the left and right sides (driver side and passenger side) of the platform 181, and not at the front or rear of the platform 181. And, all walls need not include a vent, but can just provide protection against the devices being charged from inadvertently falling off the platform 181 or out of the tray 180. And the intake vent need not be on the passenger side and the exhaust vent on the driver side, but arranged in other configurations, such as being switched. Though the walls 190 are shown as separate elements positioned at one or more sides of the platform 181, in one example a single contiguous wall is provided about the entire periphery of the platform 181. Still further dividing walls are provided to separate the platform 181 into multiple platforms each holding one device to be charged.

The battery charging apparatus 100, including the charging device storage compartment 158 and the charger compartment 110, is integrally formed as a single unitary piece, such as by molded plastic. It will be recognized in one example, however, that the various components, including the charging device storage compartment 158 and the charger compartment 110, are separate pieces that are coupled together. The entire battery charging apparatus 100 is built-in to the vehicle dashboard, such as above the control panel 22 and between the passenger and the driver. The disclosure shows and describes a battery charging apparatus 100. The disclosure further includes a vehicle dashboard having an integrated battery charging apparatus 100. The disclosure further includes a vehicle having a battery charging apparatus 100 integrated into the vehicle, such as at the vehicle dashboard, though the battery charging apparatus 100 can be integrated at other locations in a vehicle or other non-vehicle device. The battery charging apparatus is configures so that the battery charger housing is sufficiently close to the platform so that the wireless battery charger wirelessly charges the device in the platform.

In addition, as noted above, the system and method of the present disclosure can optionally include operation by one or more processing devices, such as to control when to turn the blower ON and OFF, and the blower level (high, low). It is noted that the processing device can be any suitable device, such as a computer, microprocessor, or vehicle control system. Or, the processing device can be controlled remotely such as on a smartphone, tablet, or the like. The processing devices can be used in combination with other suitable components, such as a display device (monitor, LED screen, digital screen, etc.), memory or storage device, input device (touchscreen, keyboard, pointing device such as a mouse), wireless module (for RF, Bluetooth, infrared, WiFi, etc.). The information may be stored on a computer medium such as a computer hard drive, on a CD ROM disk or on any other appropriate data storage device, which can be located at or in communication with the processing device. The entire process is conducted automatically by the processing device, and without any manual interaction. Accordingly, unless indicated otherwise the process can occur substantially in real-time without any delays or manual action.

The operation of the processing device(s) is implemented by computer software that permits the accessing of data from an electronic information source. The software and the information in accordance with the disclosure may be within a single, free-standing computer or it may be in a central computer networked to a group of other computers or other electronic devices. The information may be stored on a computer hard drive, on a CD ROM disk or on any other appropriate data storage device. The system can also be implemented on the cloud and comprise a cloud computing system which provide access via the Internet to shared computing resources, such as servers, storage devices, networks, and/or applications on demand or in real time without regard to the location of those resources.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as cuboid, rectangular cuboid, flush, ergonomic, pyramid, curved, elongated, opposite, transverse, flat, vertical, horizontal, periphery, upward, raised, top, bottom, left, right, up, down, inner, and outer. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A vehicle battery charging apparatus for wirelessly charging a device, said apparatus comprising:
   a charging device compartment having a platform for retaining the device;
   a battery charger housing for retaining a wireless battery charger;
   one or more housing vents in said battery charger housing;
   a blower in air communication with said battery charger housing for communicating air with said battery charger housing through said one or more housing vents to cool the wireless battery charger;
   at least one raised wall extending upward from said platform at one or more sides of said platform, said at least one raised wall including an inwardly-facing side and an outwardly-facing side; and
   one or more wall vents formed in said outwardly-facing side of said at least one raised wall at the one or more sides of said platform.

2. The vehicle battery charging apparatus of claim 1, wherein said one or more housing vents includes one or more intake housing vents and one or more exhaust housing vents.

3. The vehicle battery charging apparatus of claim 1, wherein said blower is inside said battery charger housing.

4. The vehicle battery charging apparatus of claim 1, further comprising said wireless battery charger.

5. The vehicle battery charging apparatus of claim 1, wherein said blower comprises a fan.

6. The vehicle battery charging apparatus of claim 1, said platform having a top surface with a rubber coating.

7. The vehicle battery charging apparatus of claim 1, wherein said one or more housing vents are in air flow communication with said one or more wall vents.

8. The vehicle battery charging apparatus of claim 1, further comprising one or more platform vents formed in said platform, said blower in air communication with said one or more platform vents via said one or more housing vents.

9. The vehicle battery charging apparatus of claim 1, wherein said battery charger housing is configured to be sufficiently close to said platform so that the wireless battery charger wirelessly charges the device in said platform.

10. The vehicle battery charging apparatus of claim 1, wherein said charging device compartment and said battery charger housing form a single unitary piece.

11. The vehicle battery charging apparatus of claim 1, wherein said vehicle battery charging apparatus is built-in to a vehicle dashboard and wherein the charging device compartment is accessible to a user and said battery charger housing is recessed within the dashboard and inaccessible to the user.

12. A vehicle dashboard, comprising:
   a dashboard housing;
   a battery charging device compartment built-in to said dashboard, said battery charging device having a platform for retaining a device to be charged;
   a battery charger housing built-in to said dashboard, said battery charger housing retaining a wireless battery charger;
   at least one raised wall extending upward from said platform at the one or more sides of said platform, said at least one raised wall including an inwardly-facing side and an outwardly-facing side; and one or more wall vents formed in said outwardly-facing side of said at least one raised wall at the one or more sides of said platform.

13. The vehicle dashboard of claim 12, further comprising:
one or more housing vents in said battery charger housing; and
a blower in air communication with said battery charger housing for communicating air with said battery charger housing through said one or more housing vents to cool the wireless battery charger.

14. The vehicle battery charging apparatus of claim 12, wherein said blower comprises a fan.

15. The vehicle dashboard of claim 12, said platform having a top surface with a rubber coating.

16. The vehicle dashboard of claim 13, wherein said one or more housing vents are in air flow communication with said one or more wall vents.

17. The vehicle dashboard of claim 12, further comprising one or more platform vents formed in said platform, said blower in air communication with said one or more platform vents via said one or more housing vents.

18. The vehicle dashboard of claim 12, wherein said battery charger housing is configured to be sufficiently close to said platform so that the wireless battery charger wirelessly charges the device in said platform.

* * * * *